United States Patent
Ishii et al.

(10) Patent No.: US 8,723,965 B2
(45) Date of Patent: May 13, 2014

(54) IMAGE PROCESSING DEVICE, IMAGING DEVICE, AND IMAGE PROCESSING METHOD FOR PERFORMING BLUR CORRECTION ON AN INPUT PICTURE

(75) Inventors: Yasunori Ishii, Osaka (JP); Yusuke Monobe, Kyoto (JP)

(73) Assignee: Panasonic Corporation, Osaka (JP)

( * ) Notice: Subject to any disclaimer, the term of this patent is extended or adjusted under 35 U.S.C. 154(b) by 378 days.

(21) Appl. No.: 13/201,032

(22) PCT Filed: Dec. 13, 2010

(86) PCT No.: PCT/JP2010/007216
§ 371 (c)(1),
(2), (4) Date: Aug. 11, 2011

(87) PCT Pub. No.: WO2011/077659
PCT Pub. Date: Jun. 30, 2011

(65) Prior Publication Data
US 2011/0317044 A1    Dec. 29, 2011

(30) Foreign Application Priority Data
Dec. 22, 2009    (JP) ................................ 2009-290072

(51) Int. Cl.
*H04N 5/228*    (2006.01)
*G06K 9/40*    (2006.01)

(52) U.S. Cl.
USPC ..................................... 348/208.14; 382/255

(58) Field of Classification Search
USPC .................................................... 348/208.14
See application file for complete search history.

(56) References Cited

U.S. PATENT DOCUMENTS

| | | | |
|---|---|---|---|
| 7,440,634 B2 * | 10/2008 | Ben-Ezra et al. | 382/255 |
| 8,068,687 B2 * | 11/2011 | Nishiyama et al. | 382/255 |
| 8,228,390 B2 * | 7/2012 | Okada et al. | 348/208.6 |
| 2006/0177145 A1 * | 8/2006 | Lee et al. | 382/255 |

(Continued)

FOREIGN PATENT DOCUMENTS

| | | |
|---|---|---|
| JP | 2006-339784 | 12/2006 |
| JP | 2007-74031 | 3/2007 |

(Continued)

OTHER PUBLICATIONS

International Search Report issued Mar. 8, 2011 in International (PCT) Application No. PCT/JP2010/007216.

(Continued)

*Primary Examiner* — Albert Cutler
(74) *Attorney, Agent, or Firm* — Wenderoth, Lind & Ponack, L.L.P.

(57) ABSTRACT

An image processing device (36) which performs blur correction on an input picture captured through a follow shot of a subject, and includes: a blur estimation unit (32) which estimates a direction and size of a blur in each of a plurality of regions in the input picture; a clustering unit (33) which performs clustering of the regions based on a similarity of the regions in at least one of the estimated direction and size of the blur; a subject region identification unit (34) which identifies at least one cluster corresponding to the subject, from among a plurality of clusters obtained through the clustering; and a blur correction unit (35) which performs blur correction on a region belonging to the identified cluster, based on the estimated direction and size of the blur.

15 Claims, 7 Drawing Sheets

(56) References Cited

U.S. PATENT DOCUMENTS

| | | | |
|---|---|---|---|
| 2007/0064115 A1 | 3/2007 | Nomura et al. | |
| 2008/0089561 A1* | 4/2008 | Zhang | 382/118 |
| 2008/0094498 A1* | 4/2008 | Mori | 348/352 |
| 2008/0253675 A1* | 10/2008 | Chou et al. | 382/255 |
| 2008/0317379 A1* | 12/2008 | Steinberg et al. | 382/275 |
| 2010/0027661 A1 | 2/2010 | Doida | |

FOREIGN PATENT DOCUMENTS

| | | |
|---|---|---|
| JP | 2007-74269 | 3/2007 |
| JP | 2007-82044 | 3/2007 |
| JP | 2008-58546 | 3/2008 |
| JP | 2008-136174 | 6/2008 |
| JP | 2009-111596 | 5/2009 |
| JP | 2009-267523 | 11/2009 |
| WO | 2007/074605 | 7/2007 |

OTHER PUBLICATIONS

Qi, Shen et al., "High-Quality Motion Deblurring From a Single Image", ACM Transactions on Graphics, vol. 27, No. 3, Article 73, Publication date: Aug. 2008.

* cited by examiner

IMAGE PROCESSING DEVICE, IMAGING DEVICE, AND IMAGE PROCESSING METHOD FOR PERFORMING BLUR CORRECTION ON AN INPUT PICTURE

TECHNICAL FIELD

The present invention relates to an image processing device, an imaging device and an image processing method which correct blurring in an input picture captured through a follow shot of a subject.

BACKGROUND ART

In recent years, cameras are becoming more convenient with the increase in functions offered by these cameras. User's needs are shifting towards imaging techniques supported by camera functions. One of such imaging techniques is the follow shot. Follow shot refers to capturing a picture by pointing the lens at a subject whose image is to be kept in a specific position within the picture, and moving the camera in accordance with the movement of the subject while the shutter is open so that the position of the subject does not shift. In a follow shot picture, the subject appears still and the background comes out blurred, with the degree of blurring depending on the amount of camera movement during the exposure.

As a result, in a follow shot picture, it is possible to express the sense of speed of a fast-moving subject such as an airplane during take-off and landing or low-level flight, or a moving train, automobile, or bike.

In the case where a user takes a follow shot by moving the camera by hand, there are many instances where even the image of the subject becomes blurred due to significant hand shaking. In particular, follow shot photography is a difficult imaging technique when the user is not skilled at hand-held photography. Even when a follow shot is taken using equipment such as a monopod or tripod, there are cases where the image of the subject is blurred in a direction that is different from the direction in which the subject is moving.

Conventionally, methods of performing blur correction of follow shot pictures have been presented (for example, see Patent Literature 1 (PTL 1)). FIG. 1 is a block diagram showing a conventional imaging device disclosed in PTL 1.

In FIG. 1, the imaging device includes an imaging unit 11, a control system unit 12, a cause information storage unit 13, a detection unit 14, a processing unit 15, and a recording unit 16. The imaging unit 11 captures a picture. The control system unit 12 drives the imaging unit 11. The cause information storage unit 13 stores known change cause information (for example, aberration of the photographic optical system, and so on) that causes image deterioration, and so on. The detection unit 14 is configured of an angular velocity sensor, and detects the change cause information which is the cause for change such as image deterioration, and so on. The processing unit 15 processes the picture captured by the imaging unit 11. The recording unit 16 records the picture that has been processed by the processing unit 15.

Furthermore, the processing unit 15 judges whether or not the captured picture is a follow shot-captured picture. Then, when the processing unit 15 judges that the captured picture is a follow shot-captured picture, the processing unit 15 performs blur correction using data resulting from the removal of the change cause information in the direction of the follow shot, from the change cause information stored in the cause information storage unit 13.

Furthermore, conventionally, methods of generating a follow shot picture from successively-captured pictures have been presented (for example, see Patent Literature 2 (PTL 2)). FIG. 2 is a block diagram showing a conventional imaging device disclosed in PTL 2.

In FIG. 2, the imaging device includes an imaging unit 21, a background acquisition unit 22, a processing unit 23, and a synthesizing unit 24. The imaging unit 21 captures multiple frames including an image of a moving subject. The background acquisition unit 22 calculates the difference of images between the frames so as to remove the image of the moving subject from the frames. The processing unit 23 is capable of generating a picture having a blurred background by performing a blurring process on a picture from which the image of the subject has been removed. The synthesizing unit 24 generates a picture in which the background is blurred and the subject appears clearly, by superimposing the image of the subject onto the result of blurring process.

CITATION LIST

Patent Literature

[PTL 1] Japanese Unexamined Patent Application Publication No. 2007-074269
[PTL 2] Japanese Unexamined Patent Application Publication No. 2006-339784

Summary of Invention

Technical Problem

However, in the method shown in PTL 1, blurring in the direction of the follow shot cannot be corrected. Therefore, when the image of the subject that is the target of the follow shot is blurred in the direction of the follow shot, blur correction cannot be performed effectively.

Furthermore, in the method shown in PTL 2, it is not possible to obtain a background image that is blurred in the direction of movement of the subject because the blurring process is performed on a background image that is not blurred. Specifically, in the method shown in PTL 2, a follow shot picture that expresses the sense of speed of the subject cannot be obtained.

The present invention is conceived to solve the above-described problems and has as an object to provide an image processing device, an imaging device, and an image processing method that are capable of generating a picture in which the blurring of the image of the subject is suppressed and the sense of speed of the subject is expressed, by performing blur correction on a picture captured through a follow shot of the subject.

Solution to Problem

In order to solve the conventional problems, the image processing device according to an aspect of the present invention is an image processing device that performs blur correction on an input picture captured through a follow shot of a subject, the image processing device including: a blur estimation unit configured to estimate a direction and size of a blur in each of a plurality of regions in the input picture; a clustering unit configured to perform clustering of the regions based on a similarity of the regions in at least one of the estimated direction and size of the blur; a subject region identification unit configured to identify at least one cluster corresponding to the subject, from among a plurality of clusters obtained through the clustering; and a blur correction unit configured to perform blur correction on a region belonging to the identified cluster, based on the estimated direction and size of the blur.

According to this configuration, it is possible to perform the clustering of the regions in the input picture based on the similarity of the blurs. When a follow shot of a moving subject is taken, the image of the subject and the image of the background are blurred differently. Therefore, by performing clustering of the regions in the input image based on blur similarity, the picture can be divided into clusters (each a set of regions) corresponding to the subject and clusters corresponding to the background. In view of this, the blur correction of the regions belonging to a cluster corresponding to the subject is performed based on the direction and size of the blur estimated from the regions belonging to such cluster, thereby allowing the generation of a picture in which blurring of the image of the subject is suppressed and the sense of speed of the subject is expressed.

Furthermore, it is preferable that the blur estimation unit be configured to estimate the direction and the size of the blur by estimating a Point Spread Function (PSF) in each of the regions in the input picture.

According to this configuration, the PSF is estimated in each of the regions in the input picture, thereby allowing precise estimation of the direction and size of the blur.

Furthermore, it is preferable that the blur estimation unit includes: a PSF size determination unit configured to determine a size of the PSF so as to adaptively change the size of the PSF according to at least one of a feature of the input picture and an imaging condition during capturing of the input picture; and a PSF estimation unit configured to estimate a PSF of the determined size in each of the regions in the input picture.

According to this configuration, it is possible to adaptively change the size of the PSF according to the imaging conditions or the features of the input picture. In order to obtain a cluster that matches the shape of the image of the subject, it is preferable that the size of the respective regions be small. The size of each region needs to be equal to or greater than the size of the PSF. Therefore, it is preferable that the size of the PSF be as small as possible. However, when the size of the PSF is smaller than the size of the blur, the PSF cannot properly express the blur. Furthermore, depending on the features of the image inside a region, there are cases where the PSF cannot be properly estimated unless the size of the PSF is enlarged. In view of this, the size of the PSF is adaptively changed according to the imaging conditions or the features of the input picture, thereby allowing the estimation of a PSF of an appropriate size.

Furthermore, it is preferable that the PSF size determination unit be configured to determine the size of the PSF such that the more complex a contour of the subject is, the smaller the size of the PSF is.

According to this configuration, it is possible to determine the size of the PSF based on the complexity of the contour of the image of the subject. When the contour of the subject is not complex, the features in the region decrease and thus it is difficult to precisely estimate a small-sized PSF. In view of this, the size of the PSF is determined such that the size decreases as the contour of the image of the subject is more complex, thereby allowing precise estimation of the PSF.

Furthermore, it is preferable that the PSF size determination unit be configured to determine the size of the PSF such that the longer an exposure time during the capturing of the input picture is, the larger the size of the PSF is.

According to this configuration, it is possible to determine the size of the PSF such that the size increases as the exposure time is longer. A blur tends to be bigger as the exposure time is longer. Therefore, by increasing the size of the PSF as the exposure time is longer, it is possible to reduce the possibility of the size of the PSF becoming smaller than the size of the blur.

Furthermore, it is preferable that the clustering unit be configured to perform the clustering of the regions such that the smaller an L2 norm or an L1 norm between the respective PSFs of two of the regions is, the more likely the two regions are to belong to a same cluster.

According to this configuration, it is possible to precisely perform the clustering of the regions based on the L2 norm or L1 norm between PSFs.

Furthermore, it is preferable that the clustering unit be configured to perform the clustering of the regions such that the smaller a difference between vectors indicating the direction and size of the blur in a corresponding one of two of the regions is, the more likely the two of the regions are to belong to a same cluster.

According to this configuration, it is possible to precisely perform the clustering of the regions based on the difference between vectors indicating the blur.

Furthermore, it is preferable that the subject region identification unit be configured to identify, as the at least one cluster corresponding to the subject, a cluster positioned at a distance that is within a threshold from a center of the input picture.

According to this configuration, it is possible to take advantage of the characteristic that the main subject often appears at the center of the picture, and automatically and simply identify the cluster corresponding to the subject.

Furthermore, it is preferable that the subject region identification unit be configured to identify the at least one cluster corresponding to the subject, based on input information which is received from a user and indicates a position of the image of the subject in the input picture.

According to this configuration, it is possible to precisely identify a cluster corresponding to the subject, based on input information from the user.

Furthermore, it is preferable that the subject region identification unit be configured to identify, as the at least one cluster corresponding to the subject, a cluster having a blur with a size that is smaller than a threshold.

Accordingly to this configuration, it is possible to take advantage of the characteristic that the image of the background is more blurred than the image of the subject, and automatically and precisely identify the cluster corresponding to the subject.

Furthermore, it is preferable that the blur correction unit be configured to use the direction and the size of the blur estimated in each of the regions belonging to the identified cluster, to perform the blur correction on the region.

According to this configuration, it is possible to perform blur correction on a per region basis, and thus it is possible to perform more precise blur correction.

Furthermore, it is preferable that the blur correction unit be configured to use an average of the direction and the size of the blur estimated in each of the regions belonging to the identified cluster, to perform the blur correction on the region.

According to this configuration, it is possible to perform blur correction collectively on the regions belonging to a cluster, and thus it is possible to reduce the calculation load.

Furthermore, it is preferable that the blur correction unit be further configured to perform blur processing on regions belonging to the clusters other than the at least one cluster corresponding to the subject, using the direction and the size of the blur estimated in the regions belonging to the at least one cluster corresponding to the subject.

With this configuration, it is possible to perform blur correction such that the image of a region belonging to a cluster other than the cluster corresponding to the subject (that is, a cluster corresponding to the background) is blurred in the direction of the blur of the subject. Therefore, it is possible to generate a picture in which the sense of speed of the subject is further accentuated.

Furthermore, the image processing device may be configured of an integrated circuit.

Furthermore, an imaging device according to an aspect of the present invention includes the above-described image processing device, and an imaging unit configured to generate the input picture.

According to this structure, it is possible to produce the same advantageous effect as the above-described image processing device.

It should be noted that the present invention can be implemented, not only as such an image processing device, but also as an image processing method having, as steps, the operations of the characteristic constituent elements included in such an image processing device. Furthermore, the present invention can also be realized as a program which causes a computer to execute the respective steps included in the image processing method. In addition, it goes without saying that such a program can be distributed via a non-transitory recording medium such as a CD-ROM (Compact Disc Read Only Memory) and via a transmission medium such as the Internet.

Advantageous Effects of Invention

According to the present invention, a picture in which the blurring of the image of the subject is suppressed and the sense of speed of the subject is expressed can be generated by performing blur correction on a picture captured through a follow shot of the subject.

BRIEF DESCRIPTION OF DRAWINGS

FIG. 3A is a block diagram showing a functional configuration of the imaging device in the embodiment of the present invention.

DESCRIPTION OF EMBODIMENTS

Hereinafter, embodiments of the present invention shall be described with reference to the Drawings.

Figure 1:
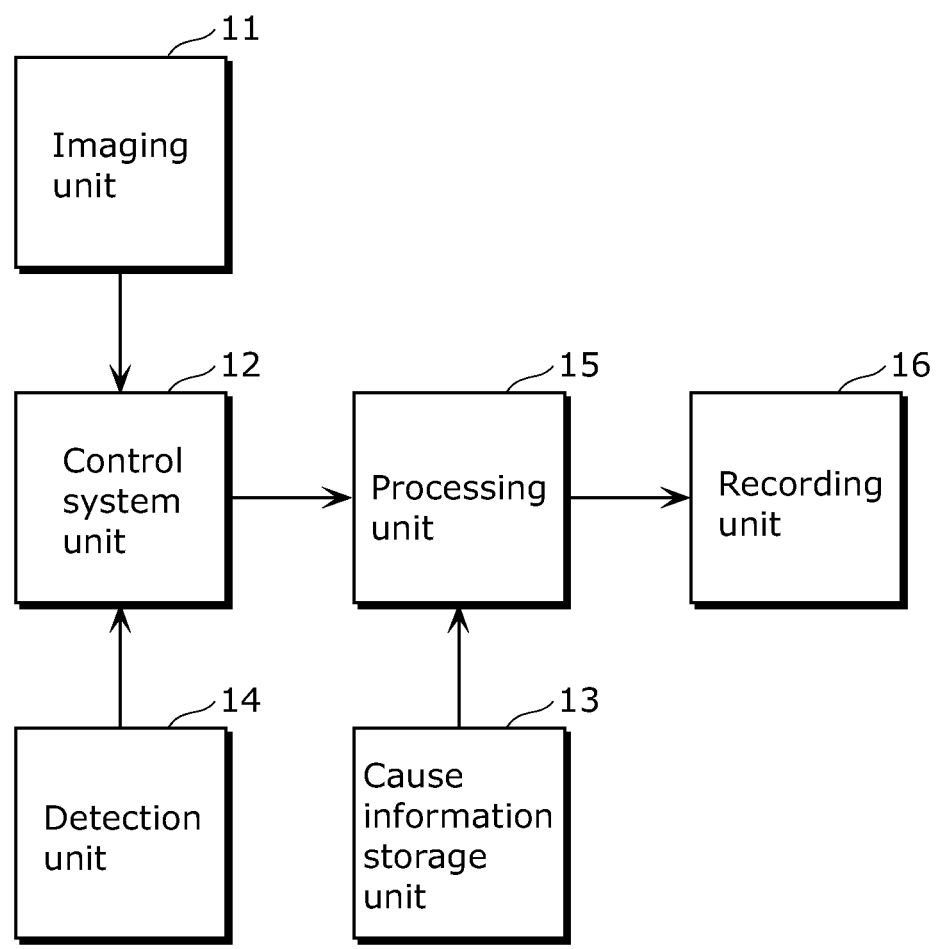
FIG. 1 is a diagram for describing an example of a conventional blur correction process.
Figure 2:
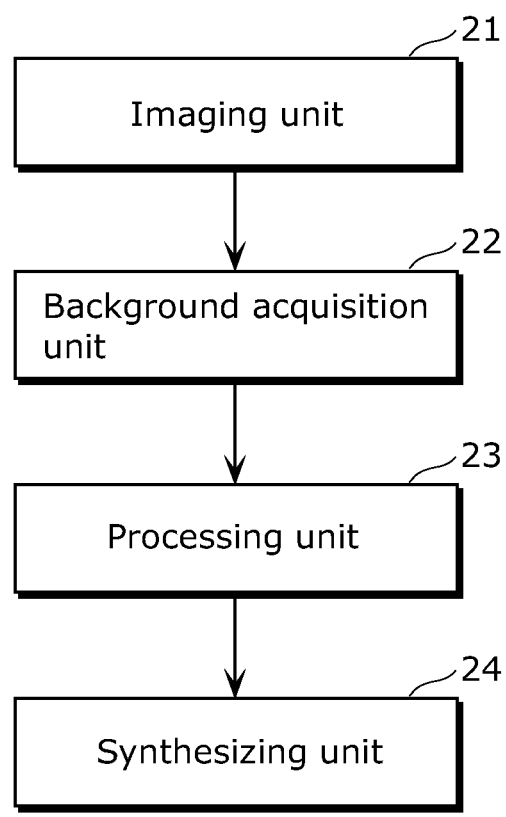
FIG. 2 is a diagram for describing another example of a conventional blur correction process.
Figure 3A:
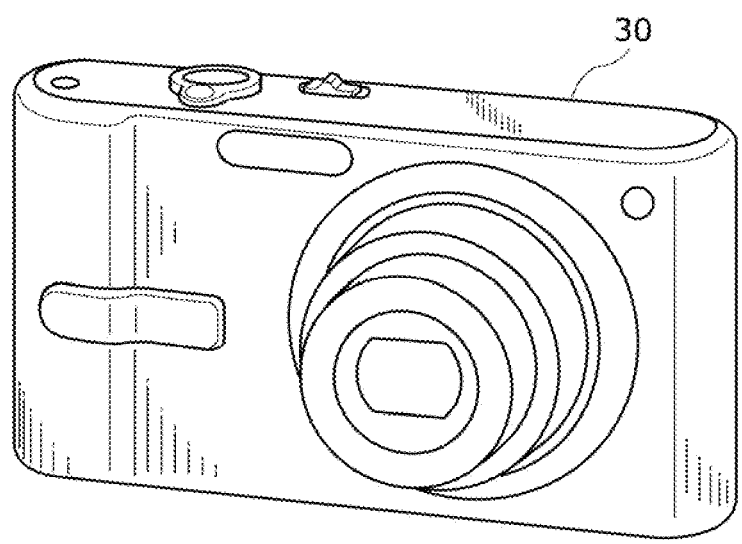
FIG. 3A is an external view of an imaging device in an embodiment of the present invention.
Figure 3B:
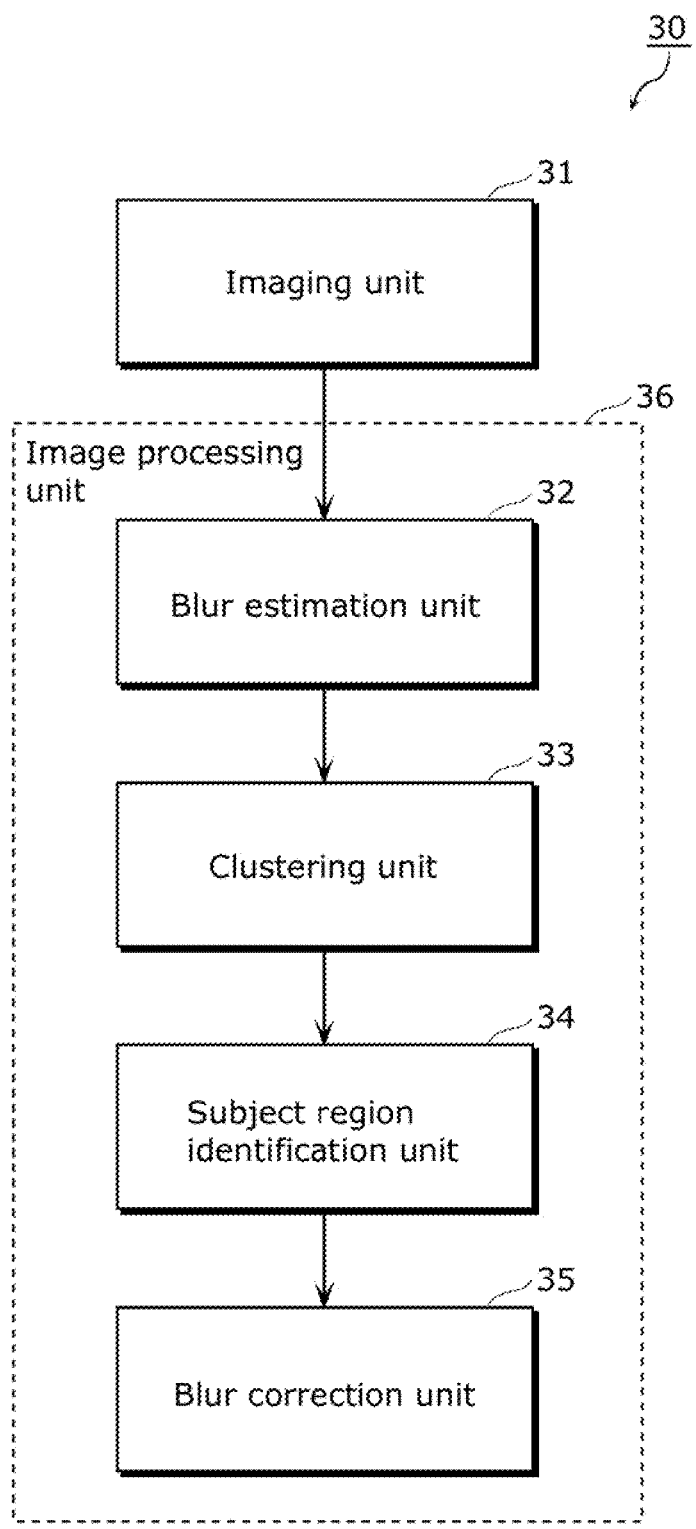

FIG. 3A is an external view of an imaging device 30 in an embodiment of the present invention. FIG. 3B is a block diagram showing a functional configuration of the imaging device 30 in the embodiment of the present invention.

In FIG. 3B, the imaging device 30 includes an imaging unit 31 and an image processing device 36. The imaging unit 31 generates a picture. Specifically, the imaging unit 31 includes an optical system and an imaging element which are not shown in the figure, and generates a picture by converting light entering via the optical system, into an electrical signal through the imaging element.

In the present embodiment, the imaging unit 31 is, for example, moved by the user to track a subject. As a result, the imaging unit 31 generates an input picture captured through a follow shot of the subject.

In an input picture generated in such manner, the image of the background is blurred in the direction in which the imaging unit 31 is moved, and the image of the subject includes a blur resulting from a combination of the movement of the imaging unit 31 and the movement of the subject. Here, out of the blurring occurring in a picture (blur), blur refers to blurring occurring due to the motion of the subject or imaging device (motion blur).

The image processing device 36 performs blur correction on the input picture captured through the follow shot of the subject. Blur correction is image processing which reduces the blur. As shown in 3B, the image processing device 36 includes a blur estimation unit 32, a clustering unit 33, a subject region identification unit 34, and a blur correction unit 35.

The blur estimation unit 32 estimates the direction and size of the blur in each of regions in the input picture. In the present embodiment, the blur estimation unit 32 estimates the direction and size of the blur by estimating, for each of the regions in the input picture, the PSF (point spread function) of such region.

Figure 4:
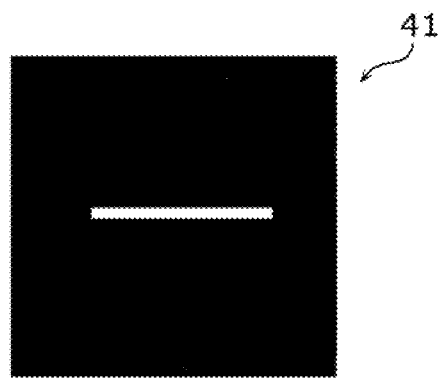
FIG. 4 is a diagram for describing PSFs.
Figure 4:
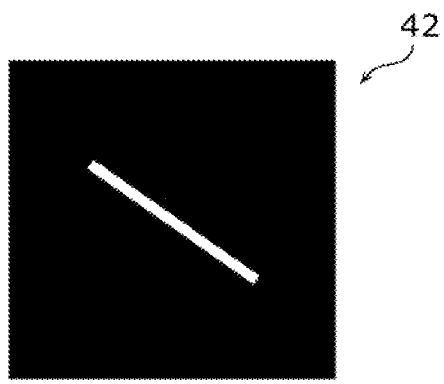
Figure 4:
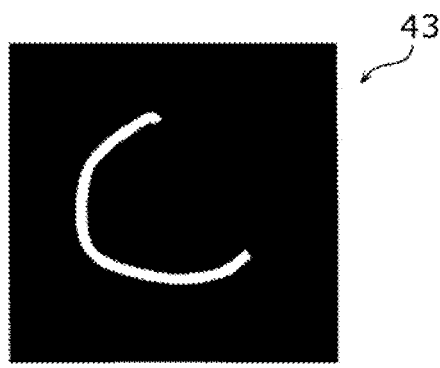

Generally, as shown in FIG. 4, PSF is expressed as the trajectory of movement and is expressed as an image having a value at a white area. In other words, PSF represents the direction and size of the blur. In FIG. 4, PSF 41 represents a crosswise blur, PSF 42 represents a diagonal blur, and PSF 43 represents a circular blur.

Figure 5:
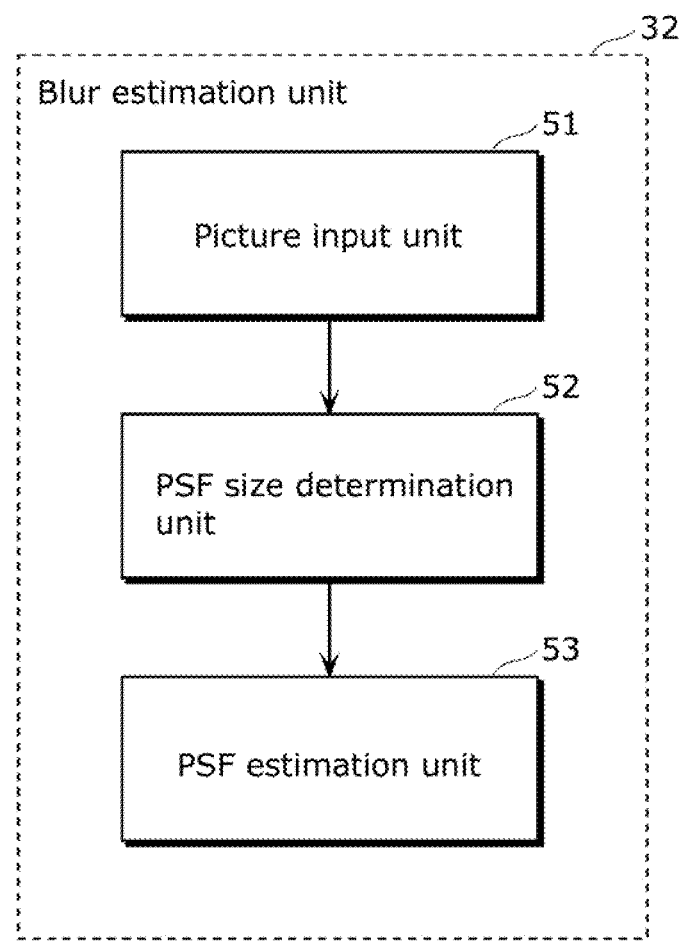
FIG. 5 is a block diagram showing a functional configuration of a PSF estimation unit in the embodiment of the present invention.

FIG. 5 is a block diagram showing a detailed functional configuration of the blur estimation unit 32 in the embodiment of the present invention. As shown in FIG. 5, the blur estimation unit 32 includes a picture input unit 51, a PSF size determination unit 52, and a PSF estimation unit 53.

The picture input unit 51 obtains the input picture from the imaging unit 31. Then, the picture input unit 51 sets multiple regions in the input picture. In the present embodiment, the picture input unit 51 sets multiple regions by dividing the input picture into rectangular regions that do not overlap with each another. The size of a region is common to all of the regions, and is the same as the PSF size (for example, 20×20 pixels) described later.

It should be noted that the regions need not necessarily be regions that do not overlap with each another, and part of a region may overlap with another region. For example, the picture input unit 51 may set multiple regions by raster scanning the input picture one pixel at a time.

The PSF size determination unit 52 determines the size of the PSF. With regard to the size of the PSF, it is generally considered that a size of approximately 20×20 pixels can sufficiently express a blur. In view of this, in the present embodiment, the PSF size determination unit 52 determines, as the size of the PSF, a size (for example, 20×20 pixels) which is predetermined as being capable of expressing a typical blur and is the same as the size of a region. It should be noted that the shape of the PSF need not necessarily be square but is preferably rectangular.

The PSF estimation unit 53 estimates, for each region, a PSF of the determined size. Various methods are available for the method of estimating the PSF. However, the PSF in each of the regions in the picture cannot be estimated using sensing information of a gyro sensor and the like. In view of this, in the present embodiment, the PSF estimation unit 53 estimates the PSF of each region by image processing. Specifically, the PSF estimation unit 53 estimates the PSF, for each region, by using the pixel values of the pixels making up the region.

Specifically, the PSF estimation unit 53 estimates the PSF of each region using the method described in, for example, Non-Patent Literature 1 ("High-Quality Motion Deblurring From a Single Image", Siggraph 2008, Qi, Shen, etc.)

With this, the PSF estimation unit 53 can estimate the direction and size of the blur in each of the regions, from a single input picture. Therefore, since it is not necessary to successively capture multiple pictures for estimating the direction and size of the blur, it is possible to reduce the processing load and simplify the configuration of the imaging unit 31.

Next, the clustering unit 33 shall be described. The clustering unit 33 performs the clustering of the regions based on the similarity in at least one out of the estimated direction and size of the blur. Specifically, the clustering unit 33 performs the clustering of the regions such that adjacent regions for which at least one out of the estimated direction and size of the blur are similar between each other belong to the same cluster.

Here, clustering refers to dividing a set of data items into partial sets of data items having similar features. Such a partial set is called a cluster. In other words, each of the multiple clusters obtained by clustering includes data items having similar features.

In the present embodiment, the clustering unit 33 performs the clustering of the regions based on PSF similarity. PSF is a function expressed by a straight line or a curved line such as those shown in FIG. 5, and can be considered to be an image. In view of this, the clustering unit 33 performs the clustering of the regions such that the smaller an L2 norm between the PSFs of two regions is, the more likely the two regions are to belong to the same cluster, as in (Equation 1) below.

[Math 1]
$$VAL = \sum_{p=1}^{N} ((P_{1p} - P_{2p}) \times (P_{1p} - P_{2p})) \quad \text{(Equation 1)}$$

In (Equation 1), VAL represents the L2 norm indicating the degree of similarity between two PSFs. A smaller value for such VAL indicates a higher degree of similarity. Furthermore, N represents the total number of pixels included in a region. Furthermore, $P_{1p}$ and $P_{2p}$ represent the pixel value of a pixel p of the two PSFs that are being compared.

Specifically, the clustering unit 33 performs the clustering of the regions based on such VAL. For example, the clustering unit 33 performs clustering such that two adjacent regions belong to the same cluster when the VAL between the PSFs of the two regions is smaller than a threshold th. Furthermore, the clustering unit 33 performs clustering such that two adjacent regions belong to different clusters when the VAL between the PSFs of the two regions is larger than the threshold th.

It should be noted that although in the present embodiment, the clustering unit 33 performs the clustering of the regions based on the L2 norm, the clustering need not necessarily be based on the L2 norm. For example, the clustering unit 33 may perform the clustering based on an L1 norm.

Furthermore, the clustering unit 33 may perform the clustering based on the direction of the blur, the size of the blur, or a combination thereof. For example, the clustering unit 33 may perform the clustering such that regions for which the difference between angles of the blurs obtained from the PSFs is smaller than a certain angle belong to a single cluster.

Furthermore, the clustering unit 33 performs the clustering of the regions such the smaller the difference between vectors indicating the direction and size of the blur of two regions is, the more likely the two regions are to belong to the same cluster. For example, the clustering unit 33 may perform the clustering such that regions for which the difference vector is smaller than a certain size belong to a single cluster. With this, the clustering unit 33 can perform the clustering of the multiple regions accurately.

As described above, the clustering unit 33 performs the clustering of the regions such that regions belong to a single cluster when the size of the values of the PSFs or the direction or size (the white line in FIG. 4) of the blurs indicated by the PSFs are similar.

Next, the subject region identification unit 34 shall be described. The subject region identification unit 34 identifies, from among the multiple clusters obtained through the clustering, a cluster corresponding to the subject that was the target of the follow shot. Generally, it is known that the image of the main subject is positioned in the vicinity of the center of the picture, and that the surface area of the image of the main subject is relatively large.

In view of this, in the present embodiment, the subject region identification unit 34 identifies a cluster in the vicinity of the center of the picture and having the largest surface area as the cluster corresponding to the subject. Specifically, the subject region identification unit 34 identifies, as the cluster corresponding to the subject, a cluster positioned at a distance that is within a threshold from the center of the input picture. Furthermore, when there are multiple clusters positioned at a distance that is within a threshold from the center of the input picture, the subject region identification unit 34 identifies, as the cluster corresponding to the subject, a cluster having the largest surface area among those clusters. Accordingly, by taking advantage of the characteristic that the main subject often appears at the center of the picture, the subject region identification unit 34 is able to identify the cluster corresponding to the subject automatically and simply.

It should be noted that the position of a cluster is a position that is representative of the regions belonging to the cluster. For example, the position of a cluster is the center position or the position of the center of gravity of the regions belonging to the cluster.

Lastly, the blur correction unit 35 shall be described.

The blur correction unit 35 uses the PSF to restore the blurred image in the regions belonging to the cluster identified by the subject region identification unit 34. Specifically, the blur correction unit 35 performs blur correction on the regions belonging to the identified cluster based on the estimated direction and size of the blur.

It should be noted that the blur correction unit 35 may perform blur correction using the method described in the previously mentioned PTL 1, a Wiener filter, or the Richardson-Lucy (Lucy-Richardson) method, and so on.

With this, the blur correction unit 35 can generate an output picture in which the background image is blurred in the direction of movement of the subject, and the image of the subject is not blurred. In other words, the blur correction unit 35 can generate an appropriate follow shot picture.

It should be noted that the blur correction unit 35 may perform the blur correction on a per region basis or on a per cluster basis. Specifically, for example, for each of the regions belonging to the identified cluster, the blur correction unit 35 may perform the blur correction on such region by using the direction and size of the blur estimated in that region. With this, the blur correction unit 35 can perform high-precision blur correction. Furthermore, for example, the blur correction unit 35 may perform blur correction on the regions belonging to the identified cluster, by using the average of the directions and sizes of the blurs estimated in each of the regions belonging to the identified cluster. With this, the blur correction unit 35 can perform the blur correction of the regions included in the cluster collectively, and thus the calculation load can be reduced.

Next, the various operations in the image processing device configured in the above manner shall be described.

Figure 6:
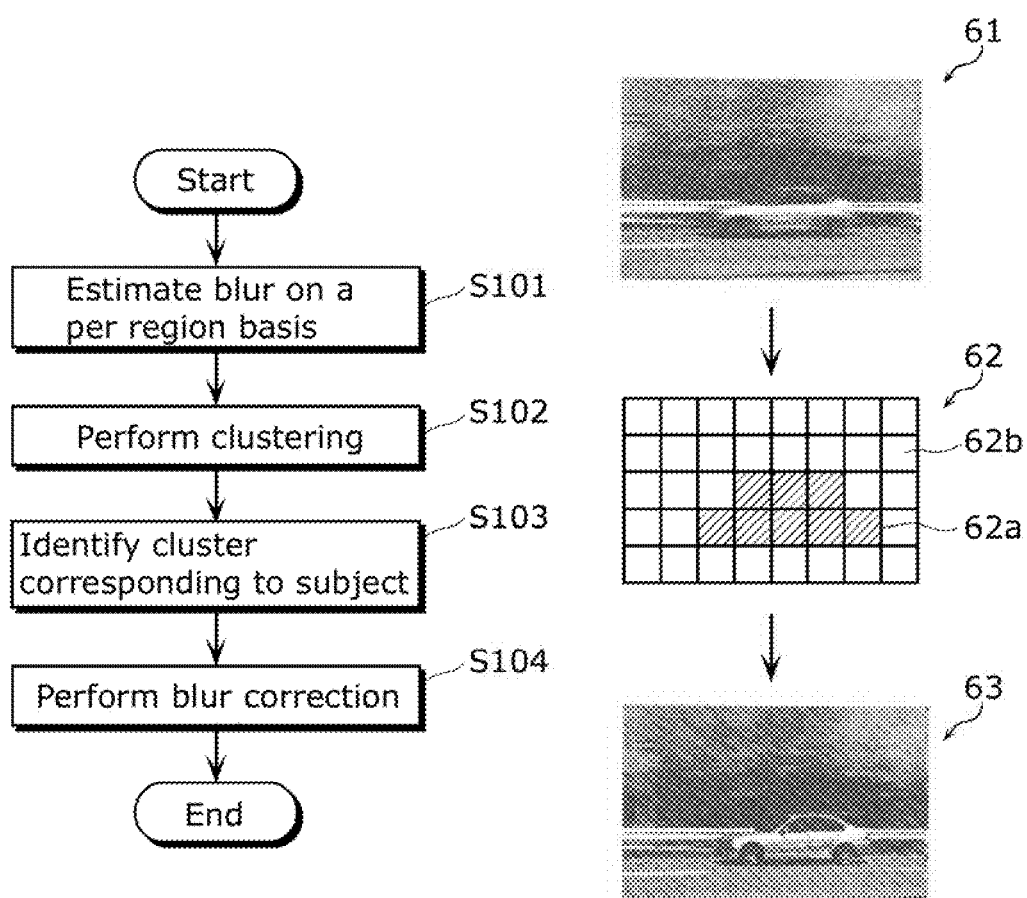
FIG. 6 is a flowchart for describing operation of an image processing device in the embodiment of the present invention.

FIG. 6 is a flowchart showing the flow of the image processing in the embodiment of the present invention.

First, the blur estimation unit 32 estimates the PSF for each of the regions in the input picture (S101). In FIG. 6, the blur estimation unit 32 divides an input picture 61 into multiple rectangular regions, and estimates the PSF for each of the rectangular regions.

Next, the clustering unit 33 performs the clustering of the regions based on the similarity of the estimated PSFs (S102). For example, as shown in a clustering result 62, the clustering unit 33 clusters the regions into a first cluster 62*a* (regions with hatching) and a second cluster 62*b* (regions without hatching).

Subsequently, the subject region identification unit 34 identifies, from among the multiple clusters obtained through the clustering, at least one cluster that corresponds to the subject (S103). For example, the subject region identification unit 34 identifies, as the cluster corresponding to the subject, the first cluster 62*a* that is positioned at the center of the input picture.

Lastly, the blur correction unit 35 corrects the blur in the regions belonging to the identified cluster based on the estimated direction and size of the blur (S104). For example, the blur correction unit 35 performs blur correction on the eight regions belonging to the first cluster 62*a* so as to generate an output picture 63.

As described above, according to the image processing device 36 in the present embodiment, separation of the image of the background and the image of the subject can be performed easily. In addition, since it is possible to perform blur correction only on the image of the main subject that is the target of the follow shot and keep the background image, as-is, in the blurred state, a follow shot picture can be easily generated.

Specifically, according to the image processing device 36 in the present embodiment, it is possible to perform the clustering of the regions in the input picture based on blur similarity. When a follow shot of a moving subject is taken, the image of the subject and the image of the background are blurred differently. Therefore, by performing clustering of the regions in the input image based on blur similarity, the picture can be divided into a cluster (set of regions) corresponding to the subject and a cluster corresponding to the background. Thus, by performing the blur correction of the regions belonging to the cluster corresponding to the subject based on the direction and size of the blur estimated from the regions belonging to such cluster, it is possible to generate a picture in which blurring of the image of the subject is suppressed and the sense of speed of the subject is expressed.

Although the image processing device according to an aspect of the present invention is described based on the embodiment, the present invention is not limited to such embodiment. Various modifications to the above-described embodiment and forms constructed by combining constituent elements of different embodiments, that may be conceived by a person of ordinary skill in the art which do not depart from the essence of the present invention are intended to be within the scope of the present invention.

For example, although, in the above-described embodiment, the blur estimation unit 32 estimates the direction and size of the blur in each of the regions by estimating the PSF of each region, the PSF need not necessarily be estimated as long as it is possible to estimate the direction and size of the blur in each region. For example, the blur estimation unit 32 may estimate the direction and size of the blur by tracking, in successively-captured pictures including the input picture, a corresponding point in each of the pictures.

Furthermore, for example, although in the above-described embodiment, the PSF size determination unit 52 determines a predetermined size as the size of the PSF, the size of the PSF need not necessarily be determined in this manner. The PSF size determination unit 52 may determine the size of the PSF such that the size is changed adaptively according to at least one of (i) the features of the input picture and (ii) imaging conditions at the time when the input picture is captured.

In order to obtain a cluster that matches the shape of the image of the subject, it is preferable that the size of the respective regions be small. The size of each region needs to be equal to or greater than the size of the PSF. Therefore, it is preferable that the size of the PSF be as small as possible. However, when the size of the PSF is smaller than the size of the blur, the PSF cannot properly express the blur. Furthermore, depending on the features of the image inside a region, there are cases where the PSF cannot be properly estimated unless the size of the PSF is enlarged. In view of this, the PSF size determination unit 52 can estimate a PSF of a proper size by adaptively changing the size of the PSF according to the imaging conditions and the features of the input picture.

Specifically, the PSF size determination unit 52 may determine the size of the PSF such that the more complex the contour of the image of the subject is, the smaller the size of the PSF is. When the contour of the subject is not complex, the features in the region decrease and thus it is difficult to precisely estimate a small-sized PSF. In view of this, the PSF size determination unit 52 determines the size of the PSF such that the size decreases as the contour of the image of the subject is more complex, thereby allowing precise estimation of the PSF. It should be noted that, generally, when the contour of the image of the subject is complex, the variance of the pixel values of the pixels making up the input picture becomes large. Therefore, the PSF size determination unit 52 may determine the size of the PSF such that the larger the variance of the pixel values of the pixels making up the input picture is, the smaller the size of the PSF is.

Furthermore, the PSF size determination unit 52 may determine the size of the PSF such that the longer the exposure time during the taking of the input picture is, the larger the size of the PSF is. Furthermore, the PSF size determination unit 52 may determine the size of the PSF such that the size of the PSF increases as the movement of the imaging device 30 at the time when the input picture is larger. In such case, the PSF size determination unit 52 may determine the size of the PSF using information obtained from a motion sensor (for example, a gyro sensor, and so on) attached to the imaging device 30. With this, the PSF size determination unit 52 can reduce the possibility of the size of the PSF becoming smaller than the size of the blur.

Furthermore, the PSF size determination unit 52 may determine the size of the PSF using subject-related information designated by the user. In this case, it is sufficient for the PSF size determination unit 52 to obtain the subject-related information by receiving an input from the user. It should be noted that the subject-related information is, for example, the type of the subject (automobile, train, airplane, person, horse, and so on), the movement speed of the subject, and so on.

It should be noted that although in the above-described embodiment, the subject region identification unit 34 identifies, as the cluster corresponding to the subject, a cluster positioned in the vicinity of the center of the input picture, the identification need not necessarily be performed in this manner. For example, the subject region identification unit 34 may identify the cluster corresponding to the subject based on input information which is received from the user and indicates the position of the image of the subject in the input picture. In this case, it is sufficient that the user designates the position of the image of the subject with respect to the input picture displayed on a touch panel, or the like. With this, the subject region identification unit 34 can precisely identify the cluster corresponding to the subject.

Furthermore, the subject region identification unit 34 may identify, as the cluster corresponding to the subject, a cluster for which the size of the blur is smaller than a threshold. Accordingly, by taking advantage of the characteristic that the image of the background is more blurred than the image of the subject, the subject region identification unit 34 is able to identify the cluster corresponding to the subject automatically and precisely.

It should be noted that the subject region identification unit 34 may identify the cluster corresponding to the subject by using a combination of the various methods described above. For example, the subject region identification unit 34 identifies, as the cluster corresponding to the subject, a cluster which is positioned in the vicinity of the center of the input picture and has little blur.

It should be noted that although in the above-described embodiment, the sizes of the regions are all the same, the sizes need not necessarily be the same. For example, the picture input unit 51 may adaptively change the size of a region according to the position of such region in the input picture.

It should be noted that although in the above-described embodiment, the input picture is a picture captured by way of the imaging unit 31 being moved by the user so as to track the subject, the input picture may be, for example, a picture that is captured with the imaging unit 31 being kept still. In this case, it is preferable that the blur correction unit 35 perform blur processing on a region belonging to a cluster other than the cluster corresponding to the subject, using the direction and size of the blur estimated in a region belonging to the cluster corresponding to the subject. Here, blur processing is image processing that accentuates the blur. Specifically, blur processing is realized, for example, by performing a convolution on the image and the PSF.

With this, the blur correction unit 35 can perform blur correction such that the image of a region belonging to a cluster other than the cluster corresponding to the subject (that is, a cluster corresponding to the background) is blurred in the direction of the blur of the subject. Therefore, the blur correction unit 35 can generate a picture in which the sense of speed of the subject is further accentuated.

It should be noted that although in the above-described embodiment, the image processing device 36 is included in the imaging device 30, the image processing device 36 need not necessarily be included in the imaging device 30. Specifically, the image processing device 36 may be configured as a device that is independent from the imaging device 30.

Furthermore, part or all of the constituent elements included in the image processing device 36 may be configured from a single system LSI (Large Scale Integration). For example, the image processing device 36 may be configured of a system LSI that includes the image processing device 32, the clustering unit 33, the clustering unit 33, the subject region identification unit 34, and the blur correction unit 35.

The system LSI is a super multi-function LSI that is manufactured by integrating multiple components in one chip, and is specifically a computer system which is configured by including a microprocessor, a ROM (Read Only Memory), a RAM (Random Access Memory), and so on. A computer program is stored in the RAM. The system LSI accomplishes its functions through the operation of the microprocessor in accordance with the computer program.

Although a system LSI is mentioned here, the integrated circuit can also be called an IC, an LSI, a super LSI, and an ultra LSI, depending on differences in the degree of integration. Furthermore, the method of circuit integration is not limited to LSIs, and implementation through a dedicated circuit or a general-purpose processor is also possible. A Field Programmable Gate Array (FPGA) which allows programming after LSI manufacturing or a reconfigurable processor which allows reconfiguration of the connections and settings of the circuit cells inside the LSI may also be used.

In addition, depending on the emergence of circuit integration technology that replaces LSI due to progress in semiconductor technology or other derivative technology, it is obvious that such technology may be used to integrate the function blocks. Possibilities in this regard include the application of biotechnology and the like.

It should be noted that the present invention can be implemented, not only as such an image processing device which includes such characteristic processing units as those describe above, but also as an image processing method having, as steps, the characteristic processing units included in such an image processing device. Furthermore, the present invention can also be realized as a computer program which causes a computer to execute the respective characteristic steps included in the image processing method. In addition, it goes without saying that such a computer program can be distributed via a non-transitory computer-readable recording medium such as a CD-ROM and via a communication network such as the Internet.

INDUSTRIAL APPLICABILITY

The present invention is useful in an image processing device capable of performing blur correction on an input picture obtained through a follow shot of a subject, or in an imaging device such as a digital still camera, a digital video camera, and so on, which is equipped with the image processing device.

REFERENCE SIGNS LIST

30 Imaging device
31 Imaging unit
32 Blur estimation unit
33 Clustering unit
34 Subject region identification unit
35 Blur correction unit
36 Image processing device
51 Picture input unit 52 PSF size determination unit
53 PSF estimation unit

The invention claimed is:

1. An image processing device that performs blur correction on an input picture captured through a follow shot of a subject, said image processing device comprising:
a blur estimation unit configured to estimate a direction and size of a blur in each of a plurality of regions in the input picture;
a clustering unit configured to perform clustering of the regions based on a similarity of the regions in at least one of the estimated direction and size of the blur;
a subject region identification unit configured to identify at least one cluster corresponding to the subject, from among a plurality of clusters obtained through the clustering; and
a blur correction unit configured to perform blur correction on a region belonging to the identified cluster, based on the estimated direction and size of the blur,
wherein said blur estimation unit includes:
a PSF size determination unit configured to determine a size of a Point Spread Function (PSF) so as to adaptively change the size of the PSF according a shape of the subject in the input picture; and
a PSF estimation unit configured to estimate the direction and the size of the blur by estimating a PSF of the determined size in each of the regions in the input picture.

2. The image processing device according to claim 1, wherein said PSF size determination unit is configured to determine the size of the PSF such that the more complex a contour of the subject is, the smaller the size of the PSF is.

3. The image processing device according to claim 1, wherein said PSF size determination unit is configured to determine the size of the PSF such that the longer an exposure time during the capturing of the input picture is, the larger the size of the PSF is.

4. The image processing device according to claim 1, wherein said clustering unit is configured to perform the clustering of the regions such that the smaller an L2 norm or an L1 norm between the respective PSFs of two of the regions is, the more likely the two regions are to belong to a same cluster.

5. The image processing device according to claim 1, wherein said clustering unit is configured to perform the clustering of the regions such that the smaller a difference between vectors indicating the direction and size of the blur in a corresponding one of two of the regions is, the more likely the two of the regions are to belong to a same cluster.

6. The image processing device according to claim 1, wherein said subject region identification unit is configured to identify, as the at least one cluster corresponding to the subject, a cluster positioned at a distance that is within a threshold from a center of the input picture.

7. The image processing device according to claim 1, wherein said subject region identification unit is configured to identify the at least one cluster corresponding to the subject, based on input information which is received from a user and indicates a position of the image of the subject in the input picture.

8. The image processing device according to claim 1, wherein said subject region identification unit is configured to identify, as the at least one cluster corresponding to the subject, a cluster having a blur with a size that is smaller than a threshold.

9. The image processing device according to claim 1, wherein said blur correction unit is configured to use the direction and the size of the blur estimated in each of the regions belonging to the identified cluster, to perform the blur correction on the region.

10. The image processing device according to claim 1, wherein said blur correction unit is configured to use an average of the direction and the size of the blur estimated in each of the regions belonging to the identified cluster, to perform the blur correction on the region.

11. The image processing device according to claim 1, wherein said blur correction unit is further configured to perform blur processing on regions belonging to the clusters other than the at least one cluster corresponding to the subject, using the direction and the size of the blur estimated in the regions belonging to the at least one cluster corresponding to the subject.

12. The image processing device according to claim 1, wherein said image processing device is an integrated circuit.

13. An imaging device comprising:
the image processing device according to claim 1; and
an imaging unit configured to generate the input picture.

14. An image processing method for performing blur correction on an input picture captured through a follow shot of a subject, said image processing method comprising:
estimating a direction and size of a blur in each of a plurality of regions in the input picture;
performing clustering of the regions based on an inter-region similarity of the regions in at least one of the estimated direction and size of the blur;
identifying at least one cluster corresponding to the subject, from among a plurality of clusters obtained through the clustering; and
performing blur correction on a region belonging to the identified cluster, based on the estimated direction and size of the blur,
wherein said estimating comprises (i) determining a size of a Point Spread Function (PSF) so as to adaptively change the size of the PSF according a shape of the subject in the input picture, and (ii) estimating the direction and the size of the blur by estimating a PSF of the determined size in each of the regions in the input picture.

15. A program recorded on a non-transitory computer-readable recording medium, which causes a computer to execute the image processing method according to claim 14.

* * * * *